US012434771B2

United States Patent
Chino

(10) Patent No.: US 12,434,771 B2
(45) Date of Patent: Oct. 7, 2025

(54) VEHICLE BODY REAR STRUCTURE

(71) Applicant: HONDA MOTOR CO., LTD., Tokyo (JP)

(72) Inventor: Shungo Chino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 477 days.

(21) Appl. No.: 18/158,802

(22) Filed: Jan. 24, 2023

(65) Prior Publication Data

US 2023/0242182 A1    Aug. 3, 2023

(30) Foreign Application Priority Data

Jan. 28, 2022 (JP) ................................. 2022-012364

(51) Int. Cl.
  *B62D 25/08*   (2006.01)
  *B62D 25/16*   (2006.01)
  *B62D 25/20*   (2006.01)

(52) U.S. Cl.
  CPC ............. *B62D 25/08* (2013.01); *B62D 25/16* (2013.01); *B62D 25/20* (2013.01); *B62D 25/2027* (2013.01)

(58) Field of Classification Search
  CPC ........ B62D 25/00; B62D 25/02; B62D 25/08; B62D 25/2027; B62D 25/087; B62D 25/16
  USPC .............. 296/203.01, 4, 193.08, 29, 30, 198
  See application file for complete search history.

(56) References Cited

U.S. PATENT DOCUMENTS 10,501,125 B2 * 12/2019 Muramatsu ............ B62D 21/15
2019/0344835 A1   11/2019 Nishioka et al.

FOREIGN PATENT DOCUMENTS

| CN | 101386309 A |   | 3/2009 |
|----|-------------|---|--------|
| JP | 2006-218951 A |   | 8/2006 |
| JP | 2009-61817 A |   | 3/2009 |
| JP | 2011-161937 A |   | 8/2011 |
| JP | 2014-101016 A |   | 6/2014 |
| JP | 2016112991 A | * | 6/2016 |

(Continued)

OTHER PUBLICATIONS

JP2016112991 Text (Year: 2016).*

(Continued)

*Primary Examiner* — Dennis H Pedder
(74) *Attorney, Agent, or Firm* — Rankin, Hill & Clark LLP

(57) ABSTRACT

A vehicle body rear structure includes: a rear frame extending in a vehicle front-rear direction on a vehicle width direction end side of a floor panel; a rear wheel house extending upward from a vehicle width direction outer portion of the rear frame; a rear cross member extending in a vehicle width direction on the floor panel; a wheel house reinforcing member extending in an up-down direction along the rear wheel house; and an upper stiffener covering an opening of the rear frame. The upper stiffener includes forward and rearward stiffeners. The wheel house reinforcing member has a lower portion connected to the upper stiffener and to the rear cross member. The forward and rearward stiffeners are connected to each other at a connecting portion located offset in the front-rear direction from a connecting portion where the upper stiffener and the wheel house reinforcing member are connected to each other.

6 Claims, 9 Drawing Sheets

(56) References Cited

FOREIGN PATENT DOCUMENTS

| JP | 2019-196109 A | 11/2019 |
| WO | 2020/110469 A1 | 6/2020 |

OTHER PUBLICATIONS

Chinese Office Action received in corresponding Chinese application No. 202310008459.5 dated Jun. 6, 2025 with English translation (13 pages).

* cited by examiner

VEHICLE BODY REAR STRUCTURE

CROSS REFERENCE TO RELATED APPLICATIONS

This application claims the benefit of Japanese Patent Application No. 2022-012364 filed on Jan. 28, 2022, the disclosure of which is incorporated herein by reference.

TECHNICAL FIELD

The present invention relates to a vehicle body rear structure of a vehicle.

BACKGROUND ART

In recent years, there is a demand of reducing fuel consumption in view of improving the globe environment to reduce natural disasters. On the other hand, there is also a demand of preserving or improving the collision safety of vehicles. In order to satisfy these demands, development of a high-strength and light-weight vehicle body rear structure is in progress.

Japanese Laid-Open Patent Application Publication No. 2019-196109 (hereinafter referred to as Patent Document 1) discloses a structure such that a bracing member is arranged on a vehicle width direction inner face of a rear wheel house to form a closed cross-sectional structure by the rear wheel house and the bracing member. In this structure, a lower end portion of the bracing member is connected to an upper wall portion of a rear side frame.

Japanese Laid-Open Patent Application, Publication No. 2006-218951 (hereinafter referred to as Patent Document 2) discloses a rear side frame extending in a vehicle front-rear direction and having an upper wall portion formed by two separated, front and rear members.

RELATED ART DOCUMENT

Patent Document

[Patent Document 1] Japanese Laid-Open Patent Application, Publication No. 2019-196109
[Patent Document 2] Japanese Laid-Open Patent Application, Publication No. 2006-218951

SUMMARY

When combining the structures disclosed in the Patent Documents 1 and 2, the connecting portion at which the bracing member and the upper wall of the rear side frame are connected to each other and the connecting portion at which the two separated members of the upper wall portion the rear side frame are connected to each other are located at the same position, which produces a place where stress is likely to concentrate. This necessitates reinforcing those portions, leading to an increase in the weight.

The present invention has been made in view of the above-described problem, and it is an object of the present invention to provide a vehicle body rear structure with which it is possible to improve the anti-collision performance and reduce the weight.

According to one embodiment of the present disclosure, a vehicle body rear structure includes: a floor panel; a rear frame extending in a vehicle front-rear direction on a vehicle width direction end side of the floor panel and having an upper portion in which an opening is formed; a rear wheel house extending upward from a vehicle width direction outer portion of the rear frame; a rear cross member located on a vehicle width direction inner side of a lower portion of the rear wheel house and disposed extending in a vehicle width direction on the floor panel; a wheel house reinforcing member extending in an up-down direction along the rear wheel house; and an upper stiffener extending in the vehicle front-rear direction and covering the opening. The upper stiffener includes a forward stiffener and a rearward stiffener. The forward stiffener and the rearward stiffener are formed as separate members and aligned in the front-rear direction. The wheel house reinforcing member has a lower portion connected to the upper stiffener and to the rear cross member. The forward stiffener and the rearward stiffener are connected to each other at a connecting portion located offset in the front-rear direction from a connecting portion at which the upper stiffener and the wheel house reinforcing member are connected to each other.

The present invention improves the anti-collision performance and reduces the weight.

DETAILED DESCRIPTION

Figure 1:
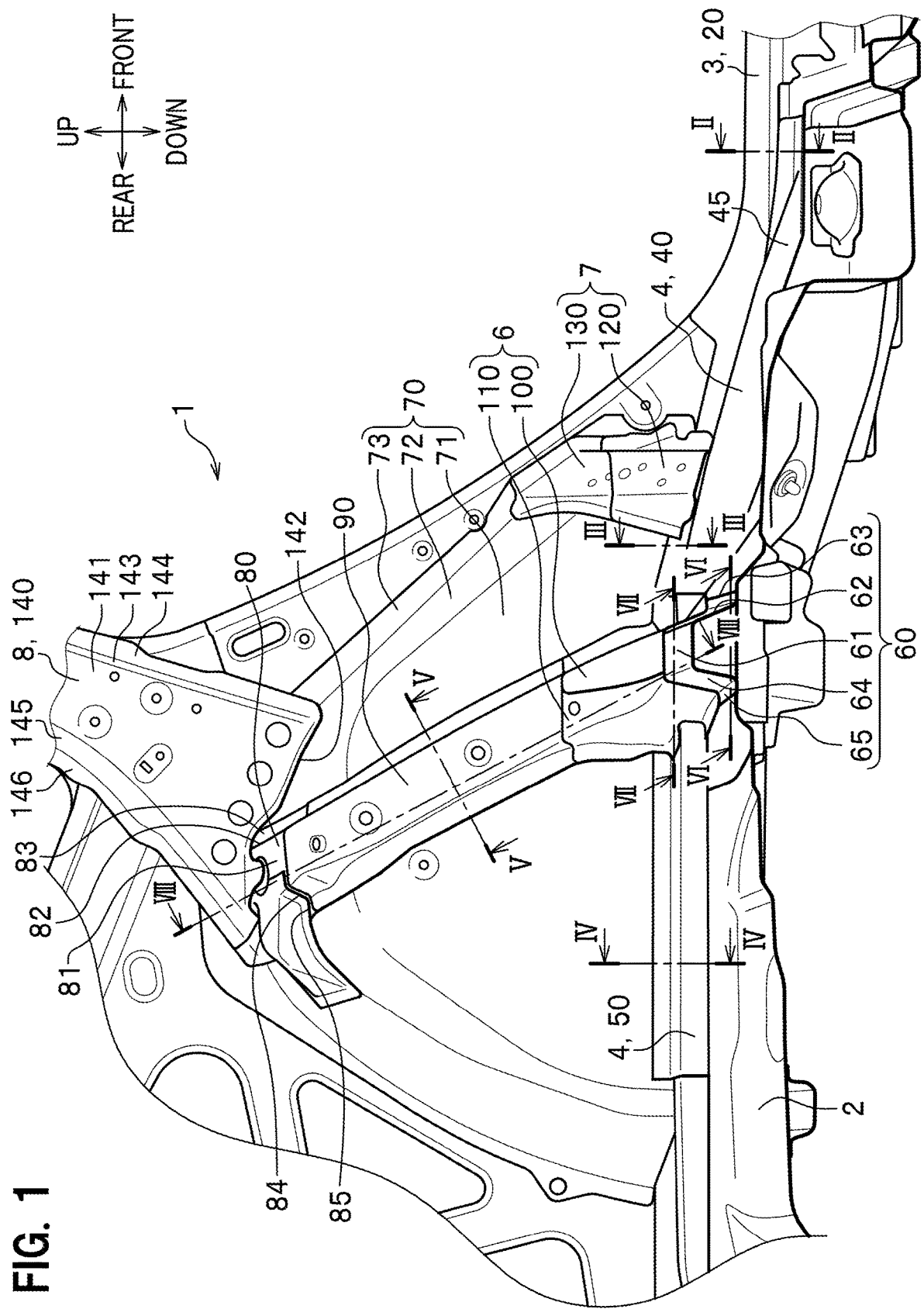
FIG. 1 is a side view schematically illustrating a vehicle body rear structure according to an embodiment of the present invention.

Hereinafter, a vehicle body rear structure of an embodiment according to the present invention will be described in detail with reference to the drawings as appropriate, for a case in which the vehicle body rear structure is applied to the left portion of a vehicle. Note that in the drawings, "front" and "rear" respectively represents forward and rearward directions i.e., vehicle front-rear directions, with respect to the advancing direction of the vehicle; and "left" and "right" respectively represents left and right directions (vehicle width directions) as seen from the driver's seat.

As illustrated in FIG. 1, a vehicle body rear structure 1 according to the embodiment includes, as metal structural members of the vehicle body, a floor panel 2, a side sill 3, a rear frame 30 (see FIGS. 3 and 4), an upper stiffener 4, and a rear cross member 60. The rear frame 30 is a member (rear frame lower part) that constitutes a lower portion of a frame (rear frame) having a rectangular closed cross section and extending in the vehicle front-rear direction. The upper stiffener 4 is a member (rear frame upper part) that constitutes an upper portion of the frame having the rectangular closed cross section. The vehicle body rear structure 1 further includes, as a metal structural member of the vehicle body, a rear wheel house 70 having a damper base 5 (see FIG. 5) inside.

The vehicle body rear structure 1 further includes, as metal structural members of the vehicle body, a wheel house upper part reinforcing member 80, a wheel house side part reinforcing member 90, a connecting member 6, a gusset 7, and a pillar 8. The wheel house upper part reinforcing member 80, the wheel house side part reinforcing member 90, and the connecting member 6 are connected to constitute a wheel house reinforcing member that reinforces the rear wheel house 70.

Floor Panel

The floor panel 2 is a plate-like member included in the floor of the vehicle body. The floor panel 2 is bridged between a pair of left and right side sills 3,3, between a pair of left and right rear frames 30,30, and between a pair of left and right upper stiffeners 4,4.

Side Sill

Figure 2:
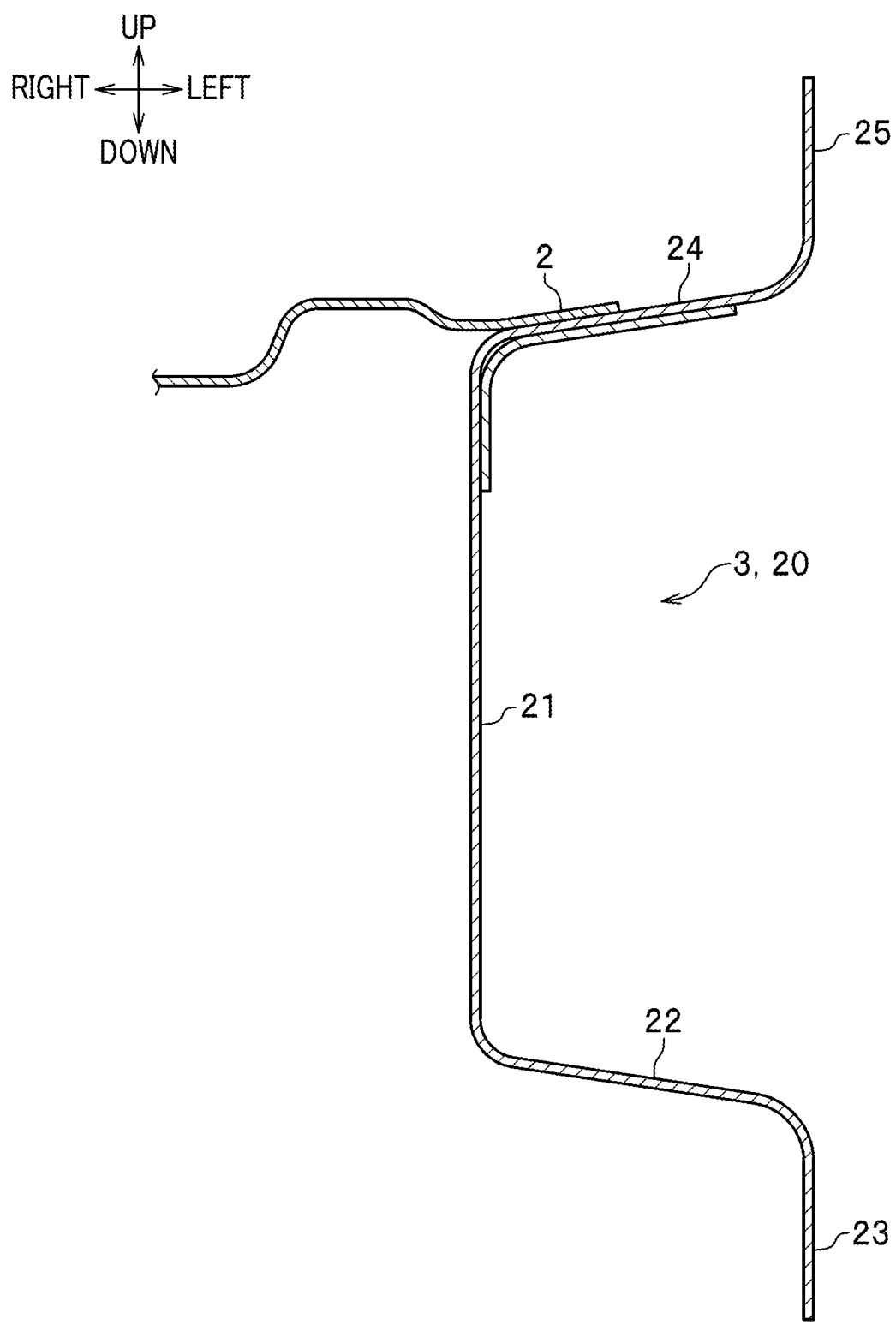
FIG. 2 is a cross-sectional view taken along line II-II in FIG. 1.

The side sill 3 is a rectangular closed cross-section member extending in the front-rear direction in a portion located in a vehicle width direction end portion of the vehicle body and located in a front-rear direction intermediate portion of the vehicle body. As illustrated in FIG. 2, the side sill 3 is formed by combining a side sill inner part 20 constituting a vehicle width direction inner portion of the side sill 3 and a side sill outer part (not illustrated) constituting a vehicle width direction outer portion of the side sill 3.

Side Sill Inner Part

The side sill inner part 20 includes: an inner wall portion 21; a lower wall portion 22 extending outward in the vehicle width direction from a lower end portion of the inner wall portion 21; and a lower flange portion 23 extending downward from a vehicle width direction outer end portion of the lower wall portion 22, which are monolithically formed with the side sill inner part 20. The side sill inner part 20 further includes: an upper wall portion 24 extending outward in the vehicle width direction from an upper end portion of the inner wall portion 21; and an upper flange portion 25 extending upward from a vehicle width direction outer end portion of the upper wall portion 24, which are monolithically formed with the side sill inner part 20.

The inner wall portion 21 includes a forward portion joined to a flange portion of the floor panel 2 by welding or the like, which flange portion extends upward from a vehicle width direction end portion of the floor panel 2. The inner wall portion 21 includes a rearward portion joined to an outer wall portion 34 of a forward portion of the below-described rear frame 30 by welding or the like. In such portions, the rectangular closed cross section of the side sill 3 and the rectangular closed cross section defined by the rear frame 30 and the upper stiffener 4 are aligned in the vehicle width direction. The lower flange portion 23 and the upper flange portion 25 are joined to the not-shown side sill outer part by welding or the like.

Rear Frame

Figure 3:
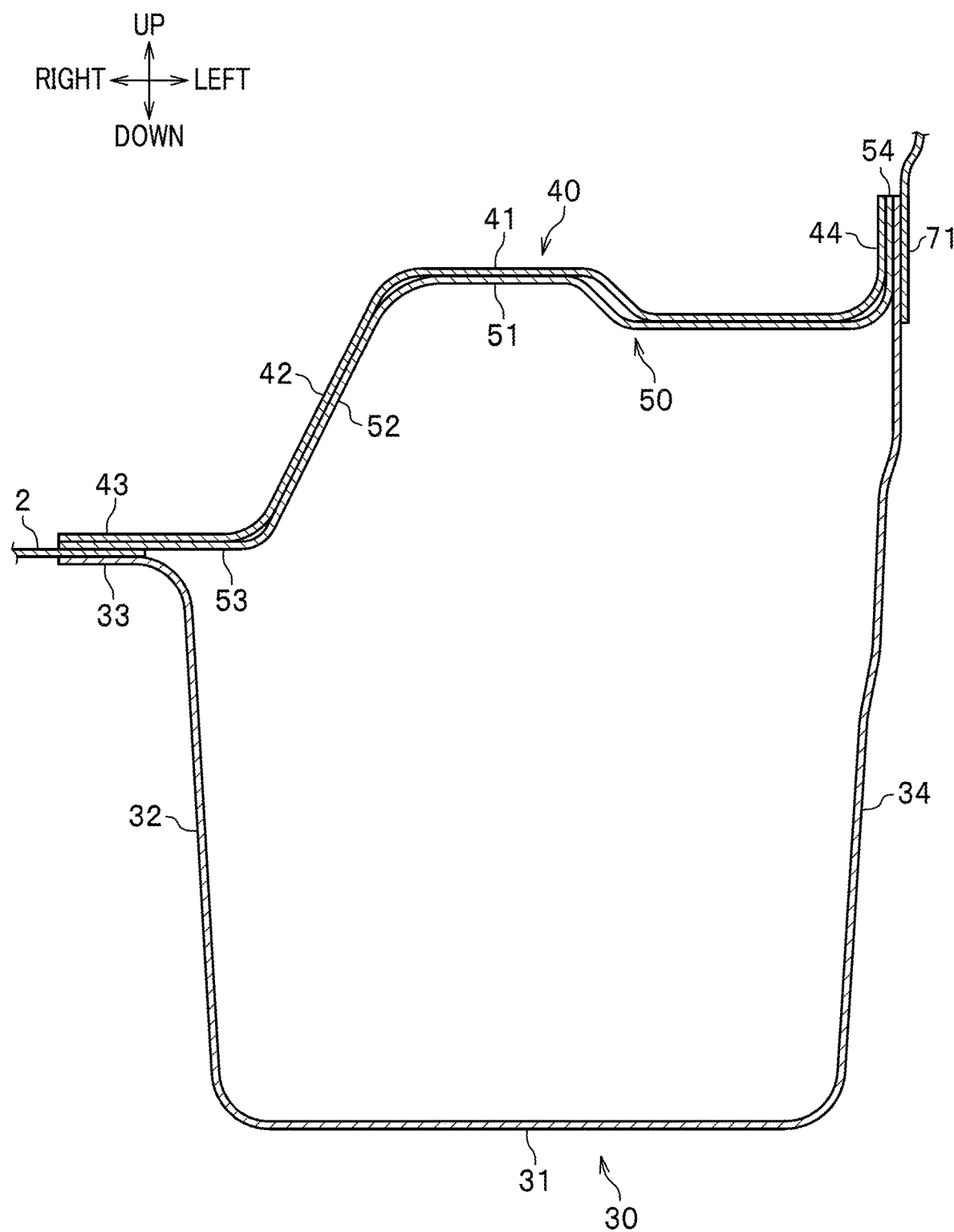
FIG. 3 is a cross-sectional view taken along line III-III in FIG. 1.
Figure 4:
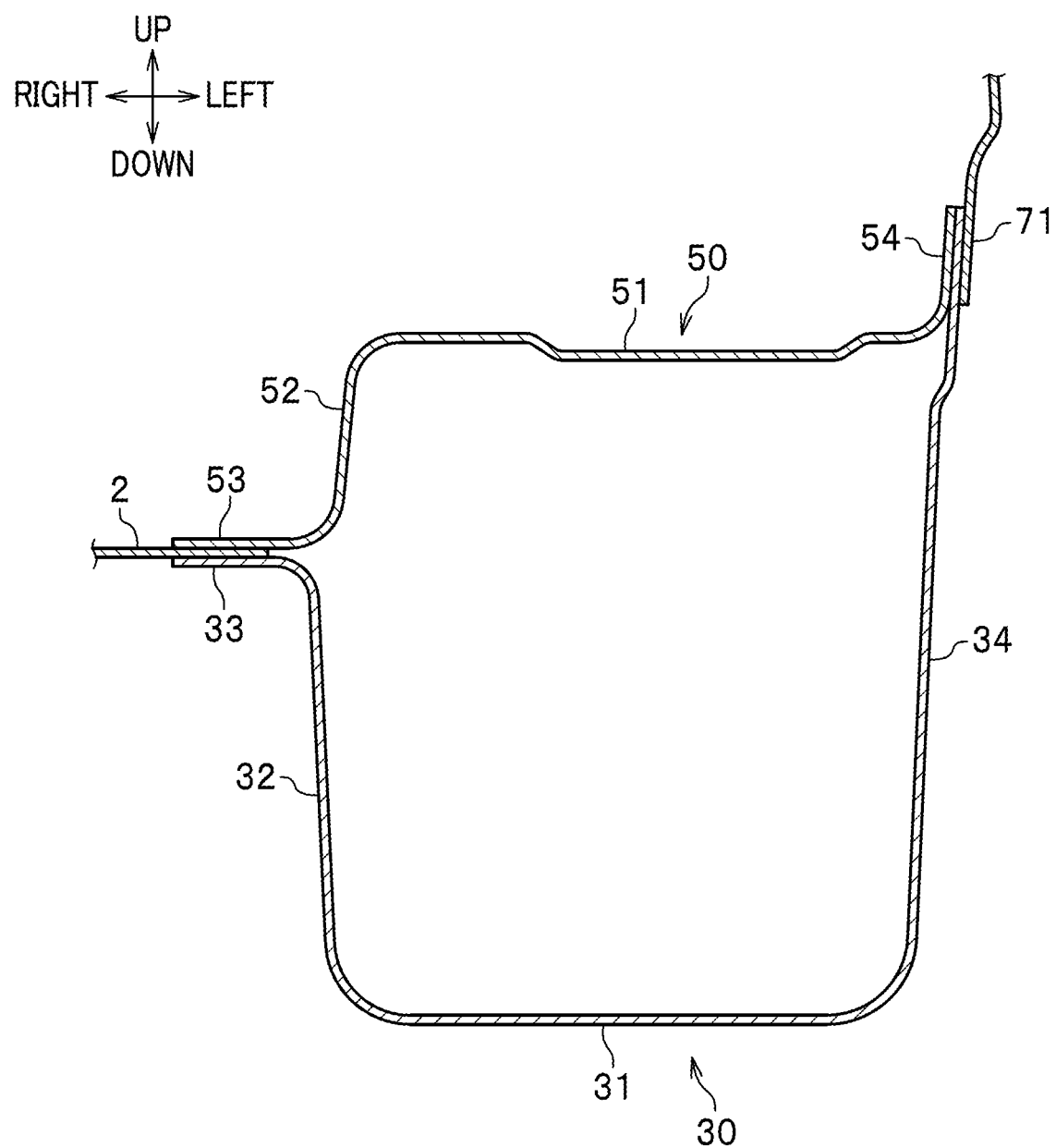
FIG. 4 is a cross-sectional view taken along line IV-IV in FIG. 1.

As illustrated in FIGS. 3 and 4, the rear frame (rear frame lower part) 30 is a member that defines a cross section having a hat-like shape and extends in the front-rear direction in a portion located in a vehicle width direction end portion of the vehicle body and located in a rearward portion of the vehicle body. The rear frame 30 defines an opening in an upper portion. The rear frame 30 includes: a lower wall portion 31; an inner wall portion 32 extending upward from a vehicle width direction inner end portion of the lower wall portion 31; and a flange portion 33 extending inward in the vehicle width direction from an upper end portion of the inner wall portion 32, which are monolithically formed with the rear frame 30. The rear frame 30 further includes an outer wall portion 34 monolithically formed therewith extending upward from a vehicle width direction outer end portion of the lower wall portion 31.

The flange portion 33 is put on the lower side of a vehicle width direction end portion of the floor panel 2 and is joined to the floor panel 2 by welding or the like. A forward portion of the outer wall portion 34 is put on the vehicle width direction inner side of the inner wall portion 21 of the side sill inner part 20 and is joined to the inner wall portion 21 by welding or the like. An upper end portion of a rearward portion of the outer wall portion 34 is put on the vehicle width direction inner side of a side wall portion 71 of the below-described rear wheel house 70 and is joined to the side wall portion 71 by welding or the like. The upper end portion of the rearward portion of the outer wall portion 34 is also put on the vehicle width direction outer side of an outer flange portion of the below-described upper stiffener 4 and is joined to the outer flange by welding or the like.

Upper Stiffener

As illustrated in FIG. 1, the upper stiffener (rear frame upper part) 4 is a plate-like member extending in the front-rear direction in a portion located in a vehicle width direction end portion of the vehicle body and located in a rearward portion of the vehicle body. The upper stiffener 4 is disposed so as to cover the opening of the rear frame 30 (see FIGS. 3 and 4) and defines a rectangular closed cross section together with the rear frame 30. The upper stiffener 4 includes a forward stiffener 40 that constitutes a forward portion of the upper stiffener 4 and a rearward stiffener 50 that constitutes a rearward portion of the upper stiffener 4. The forward stiffener 40 is formed to have a higher strength than the rearward stiffener 50. Such a structural property may be given by the materials, thicknesses, and/or shapes of the forward stiffener 40 and the rearward stiffener 50.

Forward Stiffener

A forward portion of the forward stiffener 40 is disposed on the vehicle width direction inner side of the side sill 3. A rearward portion of the forward stiffener 40 is disposed on the vehicle width direction inner side of a lower end portion of the rear wheel house 70. As illustrated in FIG. 3, the forward stiffener 40 includes: an upper wall portion 41; an inner wall portion 42 extending downward from a vehicle width direction inner end portion of the upper wall portion 41; and an inner flange portion 43 extending inward in the vehicle width direction from a lower end portion of the inner wall portion 42, which are monolithically formed with the forward stiffener 40. The forward stiffener 40 further includes: an outer flange portion 44 extending upward from a vehicle width direction outer end portion of the upper wall portion 41; and, in a forward portion of the forward stiffener 40, an outer flange bent portion 45 (see FIG. 1) extending outward in the vehicle width direction from an upper end portion of the outer flange portion 44, which are monolithically formed with the forward stiffener 40.

The forward stiffener 40 has a shape such that the height decreases as the forward stiffener 40 extends forward. Specifically, the inner wall portion 42 and the outer flange portion 44 are gradually reduced in size and are not present in a front end portion of the forward stiffener 40, in which front end portion the upper wall portion 41, the inner flange portion 43, and the outer flange bent portion 45 have approximately the same height.

The inner flange portion 43 is put on the upper side of a vehicle width direction end portion of the floor panel 2 and is joined to the floor panel 2 by welding or the like. A rearward portion of the outer flange portion 44 is put on the vehicle width direction inner side of the side wall portion 71 of the rear wheel house 70 and is joined to the side wall portion 71 by welding or the like. The outer flange bent portion 45 is put on the upper side of the upper wall portion 24 of the side sill inner part 20 and is joined to the upper wall portion 24 by welding or the like. Note that FIG. 3 illustrates a cross section of a portion where the forward stiffener 40 and the rearward stiffener 50 are overlapped and illustrates that the rearward stiffener 50 is located on the lower side of the forward stiffener 40.

Rearward Stiffener

As illustrated in FIG. 1, the rearward stiffener 50 is disposed on the vehicle width direction inner side of a lower end portion of the side wall portion 71 of the rear wheel house 70. As illustrated in FIG. 4, the rearward stiffener 50 includes: an upper wall portion 51; an inner wall portion 52 extending downward from a vehicle width direction inner end portion of the upper wall portion 51; and an inner flange portion 53 extending inward in the vehicle width direction from a lower end portion of the inner wall portion 52, which are monolithically formed with the rearward stiffener 50. The rearward stiffener 50 further includes an outer flange portion 54 monolithically formed therewith extending upward from a vehicle width direction outer end portion of the upper wall portion 51.

The inner flange portion 53 is put on the upper side of a vehicle width direction end portion of the floor panel 2 and is joined to the floor panel 2 by welding or the like. The outer flange portion 54 is put on the vehicle width direction inner side of an upper end portion of the outer wall portion 34 of the rear frame 30 and is joined to the outer wall portion 34 by welding or the like.

Rear Cross Member

As illustrated in FIG. 1, the rear cross member 60 is a member that defines a cross section having a hat-like shape and extends in the vehicle width direction on the floor panel 2. The rear cross member 60 defines an opening in a lower portion. The rear cross member 60 defines a rectangular closed cross section together with the floor panel 2. The rear cross member 60 includes: an upper wall portion 61; a front wall portion 62 extending downward from a front end portion of the upper wall portion 61; and a front flange portion 63 extending forward from a lower end portion of the front wall portion 62, which are monolithically formed with the rear cross member 60. The rear cross member 60 further includes: a rear wall portion 64 extending downward from a rear end portion of the upper wall portion 61; and a rear flange portion 65 extending rearward from a lower end portion of the rear wall portion 64, which are monolithically formed with the rear cross member 60.

The front flange portion 63 and the rear flange portion 65 are put on the upper side of the floor panel 2 and are joined to the floor panel 2 by welding or the like.

Rear Wheel House

The rear wheel house 70 houses a not-illustrated rear wheel. The rear wheel house 70 includes: a side wall portion 71 having an upwardly convex, approximately circular disk shape in side view; a periphery wall portion 72 extending outward in the vehicle width direction from an arc-shaped end portion of the side wall portion 71 and having an arc shape in side view; and a flange portion 73 extending outward in the radial direction from a radially outer end portion of the periphery wall portion 72, which are monolithically formed with the rear wheel house 70.

As illustrated in FIG. 3, a forward portion of a lower end portion of the side wall portion 71 is put on the vehicle width direction outer side of a rearward portion of the outer flange portion 44 of the forward stiffener 40 and is joined to the outer flange portion 44 by welding or the like. As illustrated in FIG. 4, a rearward portion of the lower end portion of the side wall portion 71 is put on the vehicle width direction outer side of the outer flange portion 54 of the rearward stiffener 50 and is joined to the outer flange portion 54 by welding or the like.

Damper Base

Figure 5:
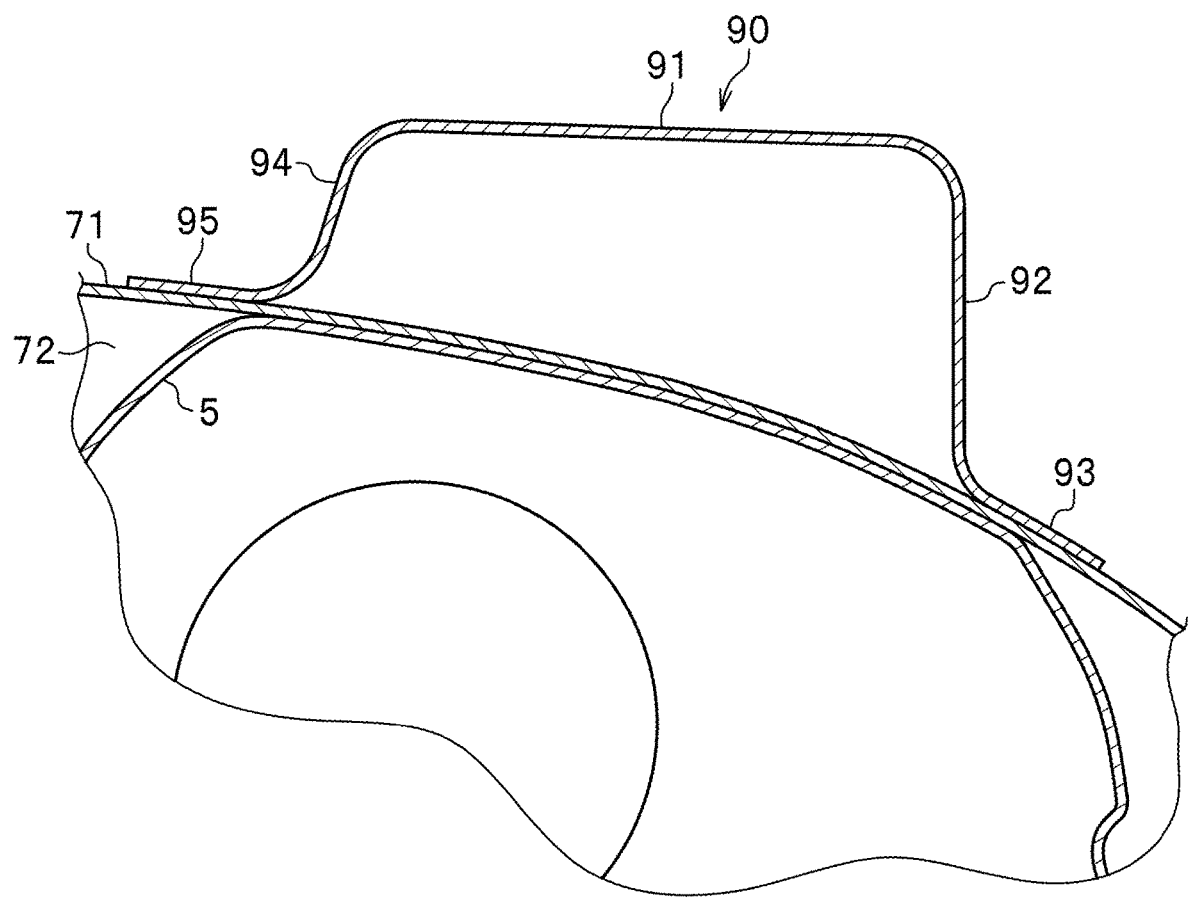
FIG. 5 is a cross-sectional view taken along line V-V in FIG. 1.

As illustrated in FIG. 5, the damper base 5 is disposed in a space defined by the side wall portion 71 and the periphery wall portion 72 of the rear wheel house 70 and is a curved plate-like member that supports an upper end portion of a suspension damper (not illustrated) that suspends a vehicle wheel in the space. The damper base 5 is joined, by welding or the like, to a lower face of an upper end portion of the periphery wall portion 72 of the rear wheel house 70 and to the vehicle width direction outer face of the side wall portion 71 of the rear wheel house 70.

Wheel House Upper Part Reinforcing Member

As illustrated in FIG. 1, the wheel house upper part reinforcing member 80 defines a rectangular closed cross section together with an upper portion (periphery wall portion 72) of the rear wheel house 70, thereby to reinforces the upper portion of the rear wheel house 70. The wheel house upper part reinforcing member 80 includes: an upper wall portion 81; a front wall portion 82 extending downward from a front end portion of the upper wall portion 81; and a front flange portion 83 extending forward from a lower end portion of the front wall portion 82, which are monolithically formed with the wheel house upper part reinforcing member 80. The wheel house upper part reinforcing member 80 further includes: a rear wall portion 84 extending downward from a rear end portion of the upper wall portion 81; and a rear flange portion 85 extending rearward from a lower end portion of the rear wall portion 84, which are monolithically formed with the wheel house upper part reinforcing member 80.

The front flange portion 83 and the rear flange portion 85 are put on the upper side of the periphery wall portion 72 and are joined to the periphery wall portion 72 by welding or the like.

Wheel House Side Part Reinforcing Member

The wheel house side part reinforcing member 90 defines a rectangular closed cross section together with the side wall portion 71 of the rear wheel house 70, thereby to reinforce the side portion of the rear wheel house 70. As illustrated in FIG. 5, the wheel house side part reinforcing member 90 includes: an inner wall portion 91; a front wall portion 92 extending outward in the vehicle width direction from a front end portion of the inner wall portion 91; and a front flange portion 93 extending forward from a vehicle width direction outer end portion of the front wall portion 92, which are monolithically formed with the wheel house side part reinforcing member 90. The wheel house side part reinforcing member 90 further includes: a rear wall portion 94 extending outward in the vehicle width direction from a rear end portion of the inner wall portion 91; and a rear flange portion 95 extending rearward from a vehicle width direction outer end portion of the rear wall portion 94, which are monolithically formed with the wheel house side part reinforcing member 90.

The front flange portion 93 and the rear flange portion 95 are put on the vehicle width direction inner side of the side wall portion 71 and are joined to the side wall portion 71 by welding or the like.

Connecting Member

As illustrated in FIG. 1, the connecting member 6 connects between a vehicle width direction end portion of the rear cross member 60 and a lower end portion of the wheel house side part reinforcing member 90. The connecting member 6 includes: a forward connecting member 100 that constitutes a forward portion of the connecting member 6; and a rearward connecting member 110 that constitutes a rearward portion of the connecting member 6. The forward connecting member 100 is formed to have a higher strength than the rearward connecting member 110. Such a structural property may be given by the materials, thicknesses, and/or shapes of the forward connecting member 100 and the rearward connecting member 110.

Forward Connecting Member

Figure 6:
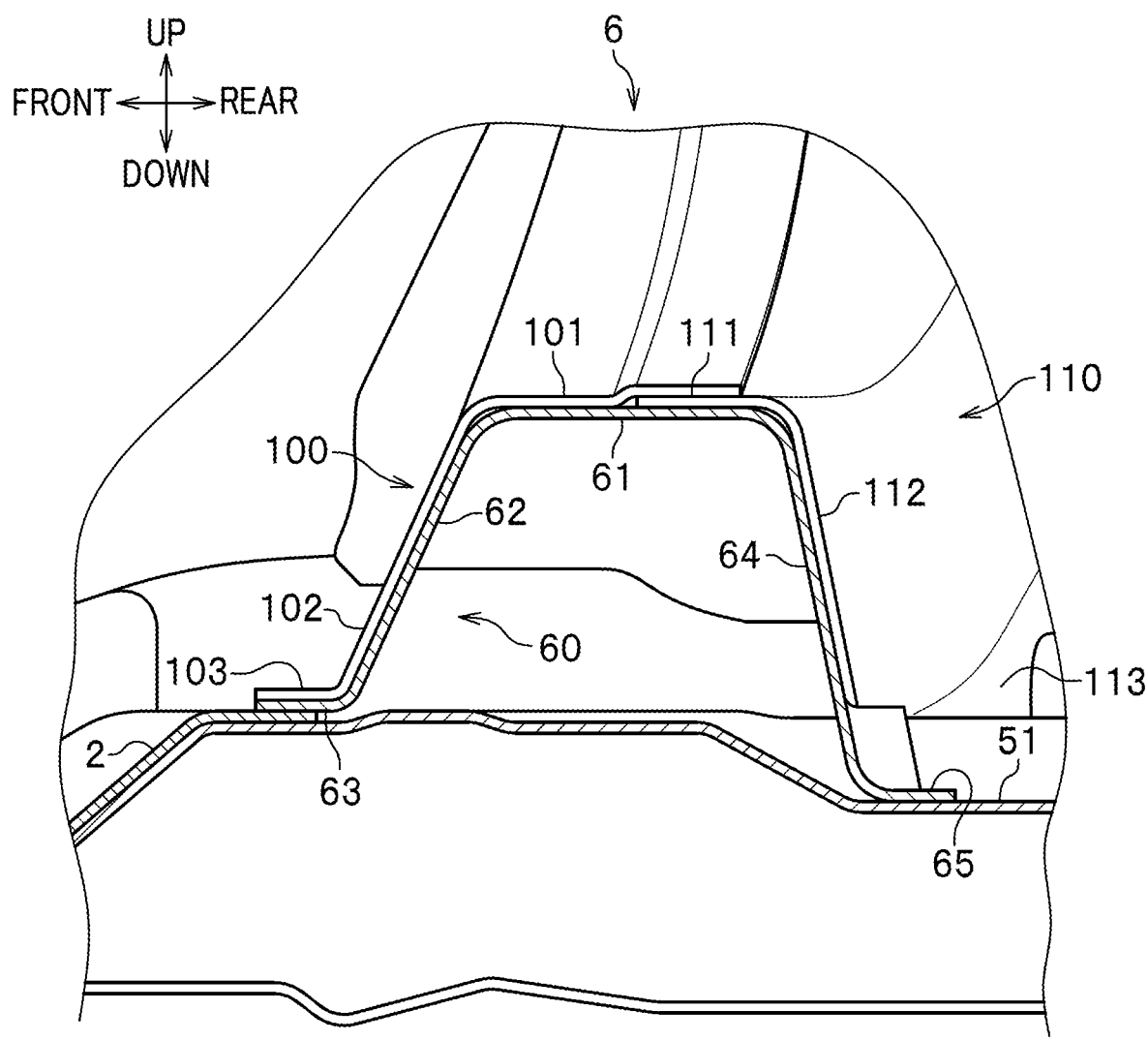
FIG. 6 is a cross-sectional view taken along line VI-VI in FIG. 1.
Figure 7:
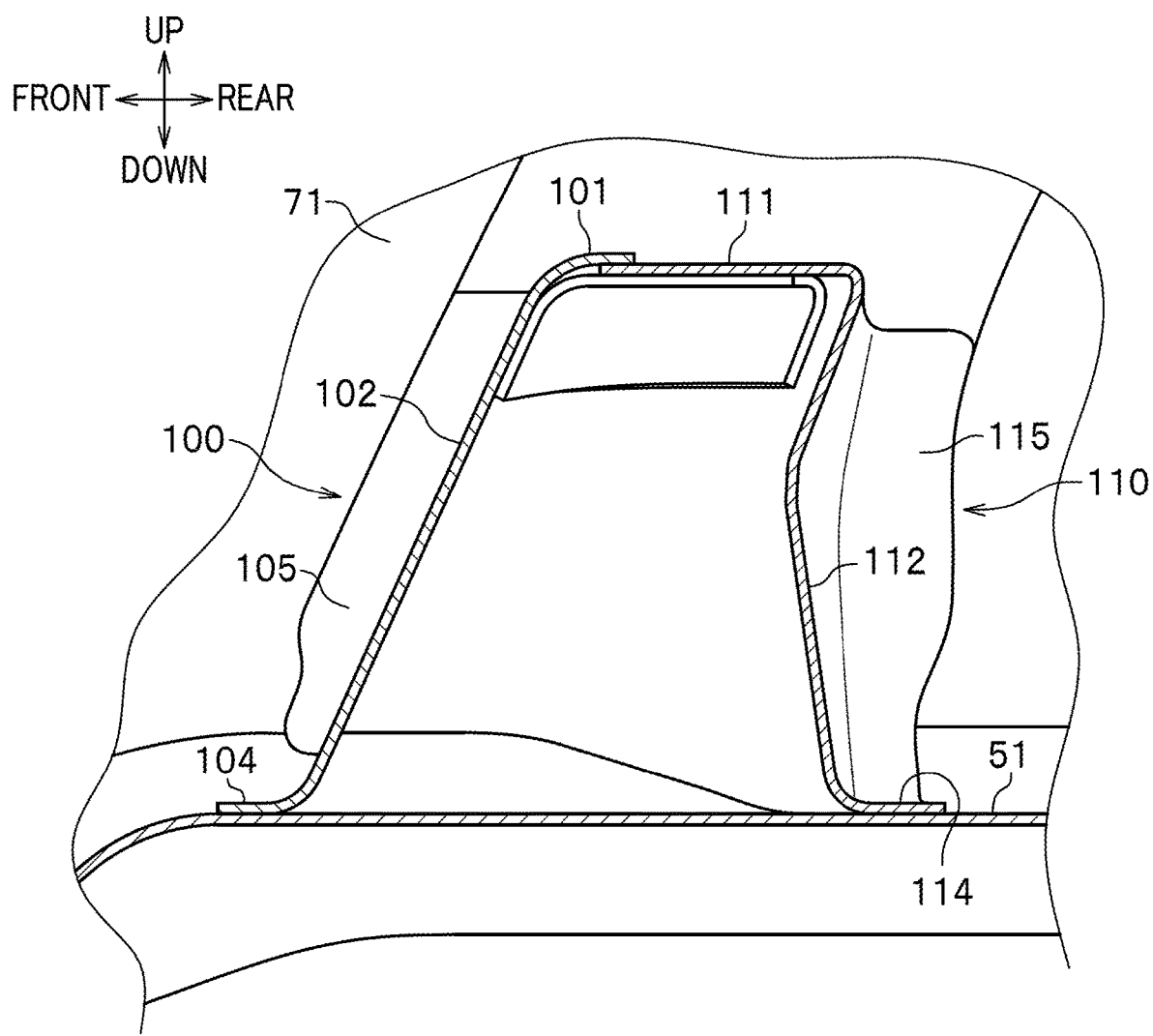
FIG. 7 is a cross-sectional view taken along line VII-VII in FIG. 1.

As illustrated in FIGS. 6 and 7, the forward connecting member 100 includes: an upper inner wall portion 101; a front wall portion 102 extending downward and outward in the vehicle width direction from a front end portion of the upper inner wall portion 101; and a first flange portion 103 extending forward from a lower end portion in a vehicle width direction inner portion of the front wall portion 102 and from a vehicle width direction outer end portion of the front wall portion 102, which are monolithically formed with the forward connecting member 100. The forward connecting member 100 further includes: a second flange portion 104 extending forward from a lower end portion of a vehicle width direction outer portion of the front wall portion 102; and a third flange portion 105 extending forward from a vehicle width direction outer end portion of the front wall portion 102, which are monolithically formed with the forward connecting member 100.

The first flange portion 103 is put on the floor panel 2, on the upper side of the inner flange portion 53 of the rearward stiffener 50, and on the vehicle width direction inner side of the inner wall portion 52, and is joined by welding or the like to the floor panel 2, to the inner flange portion 53, and to the inner wall portion 52. The second flange portion 104 is put on the upper side of the upper wall portion 51 of the rearward stiffener 50 and is joined to the upper wall portion 51 by welding or the like. The third flange portion 105 is put on the vehicle width direction inner side of the side wall portion 71 of the rear wheel house 70 and is joined to the side wall portion 71 by welding or the like.

Rearward Connecting Member

The rearward connecting member 110 includes: an upper inner wall portion 111; a rear wall portion 112 extending downward and outward in the vehicle width direction from a rear end portion of the upper inner wall portion 111; and a first flange portion 113 extending rearward from a lower end portion in a vehicle width direction inner portion of the rear wall portion 112 and from a vehicle width direction outer end portion of the rear wall portion 112, which are monolithically formed with the rearward connecting member 110. The rearward connecting member 110 further includes: a second flange portion 114 extending rearward from a lower end portion of a vehicle width direction outer portion of the rear wall portion 112; and a third flange portion 115 extending rearward from a vehicle width direction outer end portion of the rear wall portion 112, which are monolithically formed with the rearward connecting member 110.

The first flange portion 113 is put on the floor panel 2, on the upper side of the inner flange portion 53 of the rearward stiffener 50, and on the vehicle width direction inner side of the inner wall portion 52, and is joined by welding or the like to the floor panel 2, to the inner flange portion 53, and to the inner wall portion 52. The second flange portion 114 is put on the upper side of the upper wall portion 51 of the rearward stiffener 50, and is joined to the upper wall portion 51 by welding or the like. The third flange portion 115 is put on the vehicle width direction inner side of the side wall portion 71 of the rear wheel house 70 and is joined to the side wall portion 71 by welding or the like.

A rear end portion of the upper inner wall portion 101 of the forward connecting member 100 and a front end portion of the upper inner wall portion 111 of the rearward connecting member 110 are overlapped with each other and joined by welding or the like. The overlapping portion slopes such that it extends rearward as it extends downward and inward in the vehicle width direction. This configuration makes it possible to transmit a load due to a side collision occurring at a portion located forwardly of the connecting member to the rear cross member 60.

Figure 8:
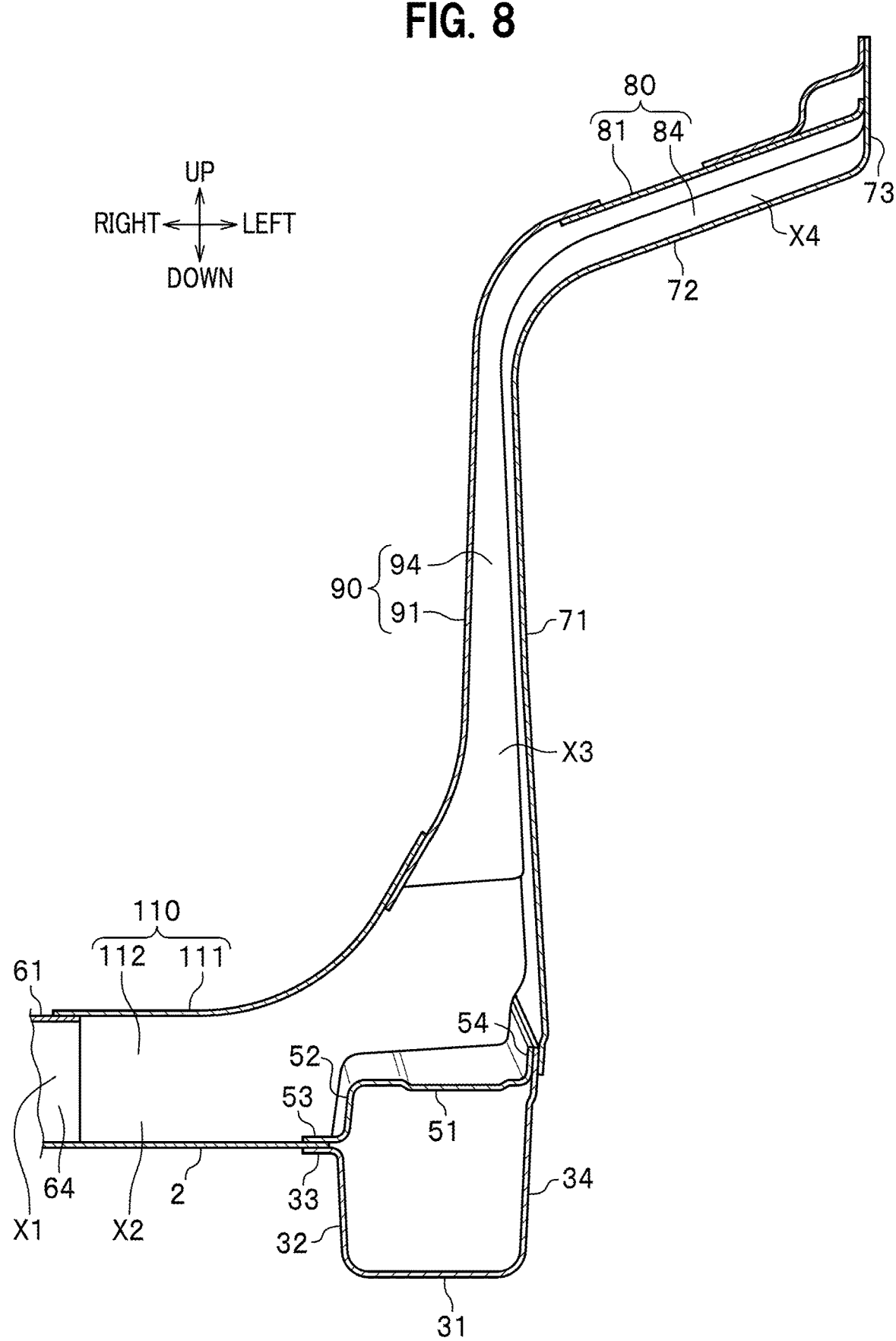
FIG. 8 is a cross-sectional view taken along line VIII-VIII in FIG. 1.

As illustrated in FIG. 8, the floor panel 2 and the rear cross member 60 together define a closed cross section X1 continuously in a vehicle width direction. The floor panel 2, the connecting member 6, the rearward stiffener 50, and the rear wheel house 70 together define a closed cross section X2, continuously in a vehicle width direction in a vehicle width direction inner portion and continuously in an up-down direction in a vehicle width direction outer portion. The wheel house side part reinforcing member 90 and the rear wheel house 70 together define a closed cross section X3 continuously in the up-down direction. The wheel house upper part reinforcing member 80 and the rear wheel house 70 together define a closed cross section X4 continuously in the vehicle width direction. The closed cross sections X1, X2, X3, and X4 are connected in series and are defined continuously.

In other words, the floor panel 2, the inner wall portion 52 and the upper wall portion 51 of the rearward stiffener 50, and the side wall portion 71 and periphery wall portion 72 of the rear wheel house 70 are connected in series and form a lower wall portion and a vehicle width direction outer wall portion of the continuously defined closed cross sections. The upper wall portion 61 of the rear cross member 60, the upper inner wall portions 101, 111 of the connecting member 6, the inner wall portion 91 of the wheel house side part reinforcing member 90, and the upper wall portion 81 of the wheel house upper part reinforcing member 80 are connected in series and form an upper wall portion and a vehicle width direction inner wall portion of the continuously defined closed cross sections. The front wall portion 62 of the rear cross member 60, the front wall portion 102 of the connecting member 6, the front wall portion 92 of the wheel house side part reinforcing member 90, and a front wall portion 81 of the wheel house upper part reinforcing member 80 are connected in series and form a front wall portion of the continuously defined closed cross sections. The rear wall portion 64 of the rear cross member 60, the rear wall portion 112 of the connecting member 6, the rear wall portion 94 of the wheel house side part reinforcing member 90, and the rear wall portion 84 of the wheel house upper part reinforcing member 80 are connected in series and form a rear wall portion of the continuously defined closed cross sections.

Gusset

Figure 9:
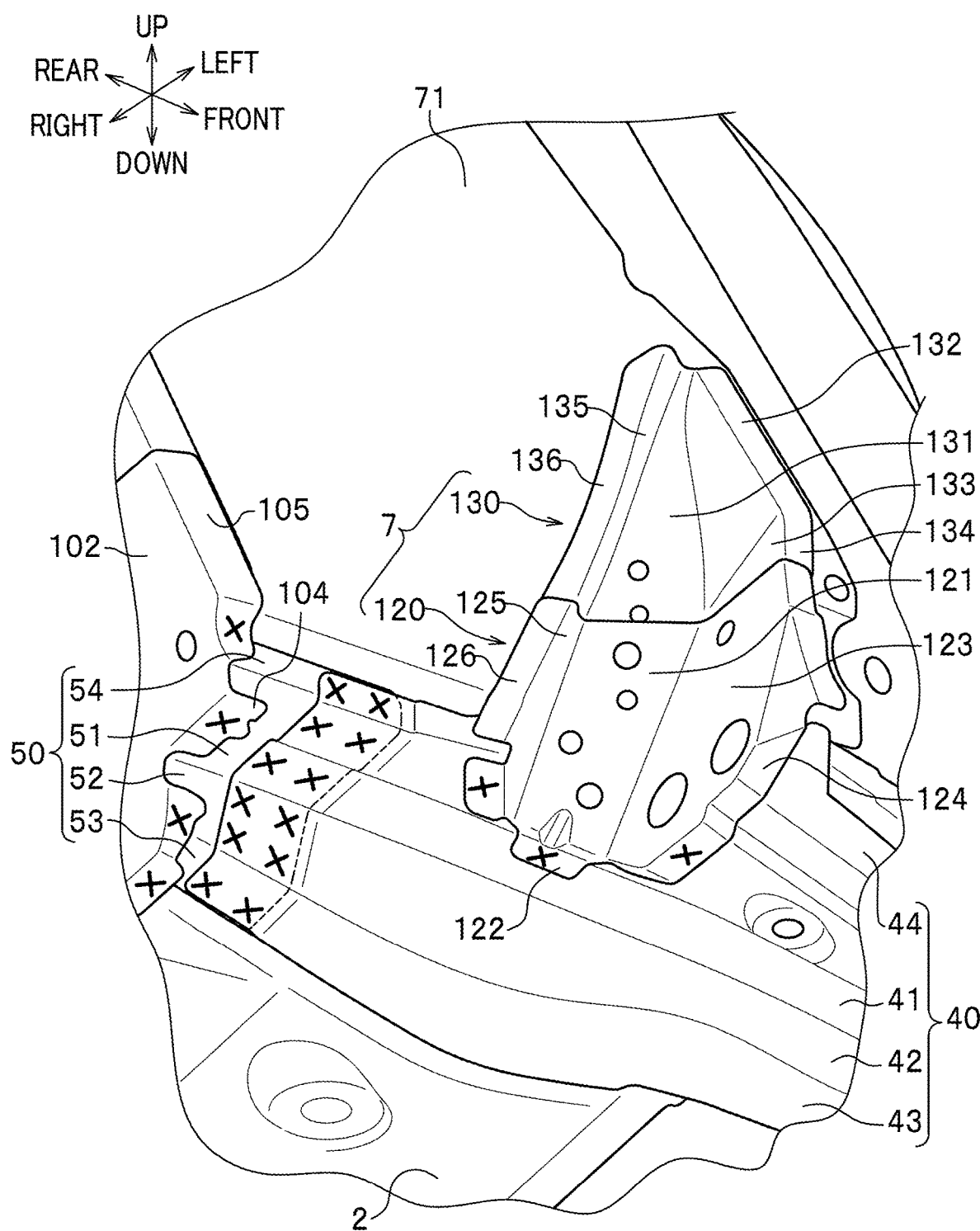
FIG. 9 is a partially enlarged view of the vehicle body rear structure illustrated in FIG. 1.

As illustrated in FIG. 9, the gusset 7 is a reinforcement member that reinforces a forward portion of the rear wheel house 70. The gusset 7 increases, on the front end side of the rear wheel house 70 located in the vicinity where a rear seat is disposed in the vehicle compartment, the vehicle body strength against side collisions. The gusset 7 includes: a lower gusset 120 that constitutes a lower portion of the gusset 7; and an upper gusset 130 that constitutes an upper portion of the gusset 7.

Lower Gusset

The lower gusset 120 includes: an inner wall portion 121; and an inner flange portion 122 extending inward in the vehicle width direction from a lower end portion of the inner wall portion 121, which are monolithically formed with the lower gusset 120. The lower gusset 120 further includes: a front wall portion 123 extending outward in the vehicle width direction from a front end portion of the inner wall portion 121; and a front flange portion 124 extending forward from a lower end portion and a vehicle width direction outer end portion of the front wall portion 123, which are monolithically formed with the lower gusset 120. The lower gusset 120 further includes: a rear wall portion 125 extending outward in the vehicle width direction from a rear end portion of an inner wall portion 121; and a rear flange portion 126 extending rearward from a lower end portion and a vehicle width direction outer end portion of the rear wall portion 125. which are monolithically formed with the lower gusset 120.

The inner flange portion 122 is put on the upper side of the upper wall portion 41 of the forward stiffener 40 and is joined to the upper wall portion 41 by welding or the like. The front flange portion 124 is put on the upper side of the upper wall portion 41 of the forward stiffener 40 and on the vehicle width direction inner side of the flange portion 73 of the rear wheel house 70 and is joined to the upper wall portion 41 and to the flange portion 73 by welding or the like. The rear flange portion 126 is put on the upper side of the upper wall portion 41 of the forward stiffener 40 and on the vehicle width direction inner side of the side wall portion 71 of the rear wheel house 70 and is joined to the upper wall portion 41 and to the side wall portion 71 by welding or the like.

Upper Gusset

The upper gusset 130 includes: an inner wall portion 131; and an upper flange portion 132 extending upward from an upper end portion of the inner wall portion 131, which are monolithically formed with the upper gusset 130. The upper gusset 130 further includes: a front wall portion 133 extending outward in the vehicle width direction from a front end portion of the inner wall portion 131; and a front flange portion 134 extending forward from a lower end portion and a vehicle width direction outer end portion of the front wall portion 133, which are monolithically formed with the upper gusset 130. The upper gusset 130 further includes: a rear wall portion 135 extending outward in the vehicle width direction from a rear end portion of the inner wall portion 131; and a rear flange portion 136 extending rearward from a lower end portion and a vehicle width direction outer end portion of the rear wall portion 135, which are monolithically formed with the upper gusset 130.

The upper flange portion 132 is put on the vehicle width direction inner side of the flange portion 73 of the rear wheel house 70 and is joined to the flange portion 73 by welding or the like. The front flange portion 134 is put on the vehicle width direction inner side of the flange portion 73 of the rear wheel house 70 and is joined to the flange portion 73 by welding or the like. The rear flange portion 136 is put on the vehicle width direction inner side of the side wall portion 71 of the rear wheel house 70 and on the front side of the periphery wall portion 72 of the rear wheel house 70 and is joined to the side wall portion 71 and to the periphery wall portion 72 by welding or the like.

As illustrated in FIG. 9, a rear end portion of the forward stiffener 40 and a front end portion of the rearward stiffener 50 are overlapped with each other and are connected to each other (joined by welding). In the overlapping portion, at least two connecting points (joint points at which welding is performed; see X marks in the drawing) are arranged in the vehicle front-rear direction.

The connecting portions (joining portions at which joining by welding is performed) connecting the forward stiffener 40 and the rearward stiffener 50 to each other are located between the forwardly located gusset 7 and the rearwardly located connecting member 6. In other words, the connecting portions (joining portions at which joining by welding is performed; see the X marks in the drawing) connecting the gusset 7 and the forward stiffener 40 to each other are located at a foremost position; the connecting portions (joining portions at which joining by welding is performed) connecting the forward stiffener 40 and the rearward stiffener 50 to each other are located at an intermediate position located rearwardly of the foremost position; and the connecting portions (joining portions at which joining by welding is performed; see the X marks in the drawing) connecting the connecting member 6 and the rearward stiffener 50 to each other are located rearwardly of the intermediate position.

Pillar

As illustrated in FIG. 1, the pillar 8 is a rectangular closed cross-section member that extends in the up-down direction between the rear wheel house 70 and the roof panel that includes the ceiling of the vehicle body. The pillar 8 is formed by combining a pillar inner part 140 that constitutes a vehicle width direction inner portion of the pillar 8 and a pillar outer part (a not-illustrated panel that forms a side face of the vehicle body) that constitutes a vehicle width direction outer portion of the pillar 8.

Pillar Inner Part

The pillar inner part 140 includes: an inner wall portion 141; and a lower flange portion 142 extending inward in the vehicle width direction from a lower end portion of the inner wall portion 141, which are monolithically formed with the pillar inner part 140. The pillar inner part 140 further includes: a front wall portion 143 extending outward in the vehicle width direction from a front end portion of the inner wall portion 141; and a front flange portion 144 extending forward from a vehicle width direction outer end portion of the front wall portion 143, which are monolithically formed with the pillar inner part 140. The pillar inner part 140 further includes: a rear wall portion 145 extending outward in the vehicle width direction from a rear end portion of the inner wall portion 141; and a rear flange portion 146 extending rearward from a vehicle width direction outer end portion of the rear wall portion 145, which are monolithically formed with the pillar inner part 140.

The lower flange portion 142 is put on the upper side of the periphery wall portion 72 of the rear wheel house 70 and on the upper side of the upper wall portion 81 of the wheel house upper part reinforcing member 80, and is joined to the periphery wall portion 72 and to the upper wall portion 81 by welding or the like. The front flange portion 144 is put on the vehicle width direction inner side of the pillar outer part and is joined to the pillar outer part by welding or the like.

The rear flange portion 146 is put on the vehicle width direction inner side of the pillar outer part and is joined to the pillar outer part by welding or the like.

Positional Relationships Among Connecting Portions of Members

As illustrated in FIG. 9, the rear end portion of the forward stiffener 40 and the front end portion of the rearward stiffener 50 are overlapped with each other and are connected to each other (joined by welding). In the overlapping portion, at least two connecting points (connecting points at which welding is performed; see the X marks in the drawing) are arranged in the vehicle front-rear direction. In other words, the two connecting points are arranged in two front and rear columns, a forwardly located first column arranged in the vehicle width direction and a second column located rearwardly thereof and arranged in the vehicle width direction.

The connecting portions (joining portions at which joining by welding is performed) connecting the forward stiffener 40 and the rearward stiffener 50 to each other are located between the forwardly located gusset 7 and the rearwardly located connecting member 6. In other words, the connecting portions (joining portions at which joining by welding is performed; see the X marks in the drawing) connecting the gusset 7 and the forward stiffener 40 to each other are located at a foremost position; the connecting portions (joining portions at which joining by welding is performed; see the X marks in the drawing) connecting the forward stiffener 40 and the rearward stiffener 50 to each other are located at an intermediate position located rearwardly of the foremost position; and the connecting portions (joining portions at which joining by welding is performed; see the X marks in the drawing) connecting the connecting member 6 and the rearward stiffener 50 to each other are located rearwardly of the intermediate position.

In the event of a side collision of the vehicle, a load due to the collision is inputted to the closed cross-sectional structure defined by the wheel house reinforcing member and the rear wheel house 70 and to the closed cross-sectional structure defined by the rear frame 30 and the upper stiffener 4. The load inputted to those closed cross-sectional structures is transmitted via the connecting member 6 to the rear cross member 60. In addition, in the event of a collision (side collision) of the vehicle, a load due to the collision is inputted to the closed cross-sectional structure defined by the gusset 7 and the rear wheel house 70. The load inputted to the closed cross-sectional structure is transmitted via the upper stiffener 4 and then the connecting member 6 to the rear cross member 60. The connecting portions connecting the gusset 7 and the forward stiffener 40 to each other, the connecting portions connecting the forward stiffener 40 and the rearward stiffener 50 to each other, and the connecting portions connecting the connecting member 6 and the rearward stiffener 50 to each other are offset from one another in the front-rear direction. Therefore, the vehicle body rear structure 1 is advantageous in terms of preventing concentration of stress due to the load generated in the event of a collision and thus improving the anti-collision performance, compared to a case where some of these connecting portions are located at the same portion.

A vehicle body rear structure 1 according to an embodiment of the present invention includes: a floor panel 2; a rear frame 30 extending in the vehicle front-rear direction on a vehicle width direction end side of the floor panel 2 and having an upper portion in which an opening is formed; a rear wheel house 70 extending upward from a vehicle width direction outer portion of the rear frame 30; a rear cross member 60 located on the vehicle width direction inner side of a lower portion of the rear wheel house 70 and disposed extending in a vehicle width direction on the floor panel 2; a wheel house reinforcing member extending in the up-down direction along the rear wheel house 70; and an upper stiffener 4 extending in the vehicle front-rear direction and covering the opening. The upper stiffener 4 includes a forward stiffener 40 and a rearward stiffener 50, which are formed as separate members and aligned in the front-rear direction. The wheel house reinforcing member has a lower portion connected to the upper stiffener 4 and to the rear cross member 60. The forward stiffener 40 and the rearward stiffener 50 are connected to each other at a first connecting portion located offset in the front-rear direction from a second connecting portion at which the upper stiffener 4 and the wheel house reinforcing member are connected to each other.

The first connecting portion at which the forward stiffener 40 and the rearward stiffener 50 are connected to each other and the second connecting portion at which the upper stiffener 4 and the wheel house reinforcing member are connected to each other are portions in which stress is likely to concentrate. The vehicle body rear structure 1 is capable of receiving the load generated in a collision (side collision) in a distributed manner by arranging the connecting portions offset in the front-rear direction, thereby to reduce the damage to those connecting portions. Therefore, the vehicle body rear structure 1 improves the anti-collision performance and reduce the weight.

According to the vehicle body rear structure 1, the forward stiffener 40 and the rearward stiffener 50 are overlapped at the first connecting portion at which the forward stiffener 40 and the rearward stiffener 50 are connected to each other, and the first connecting portion includes two connecting points arranged in the vehicle front-rear direction.

That means, according to the vehicle body rear structure 1, the first connecting portion at which the forward stiffener 40 and the rearward stiffener 50 are connected to each other has a large dimension in the front-rear direction to increase the strength of the connecting portion, which makes it possible for the vehicle body rear structure 1 to reduce the deformation of the rear frame 30 in the event of a collision (side collision) without adding a reinforcing member and to transmit the load due to the collision to the rear cross member 60, thereby to receive the load in a manner of distributing the load in a large area.

The vehicle body rear structure 1 includes a gusset 7 attached to and between the forward stiffener 40 and the rear wheel house 70. The wheel house reinforcing member is connected, at the second connecting portion, to the rearward stiffener 50. A third connecting portion at which the gusset 7 and the forward stiffener 40 are connected to each other, the first connecting portion at which the forward stiffener 40 and the rearward stiffener 50 are connected to each other, and the second connecting portion at which the rearward stiffener 50 and the wheel house reinforcing member are connected to each other are arranged in this order from front to rear.

The third connecting portion at which the forward stiffener 40 and the gusset 7 are connected to each other is a portion in which stress is likely to concentrate. This third connecting portion is arranged offset in the front-rear direction from the first connecting portion at which the forward stiffener 40 and the rearward stiffener 50 are connected to each other and from the second connecting portion at which the rearward stiffener 50 and the wheel house reinforcing member are connected to each other. This configuration makes it possible for vehicle body rear structure 1 to receive the load generated in a collision (side collision) in a distributed manner, thereby to reduce the damage to those connecting portions.

According to the vehicle body rear structure 1, the forward stiffener 40 is formed to have a higher strength than the rearward stiffener 50.

Therefore, the vehicle body rear structure 1 exercises a high anti-collision performance in a section where the rear seat is disposed and makes it possible to reduce an increase in the weight.

According to the vehicle body rear structure 1, the wheel house reinforcing member includes: a wheel house side part reinforcing member 90 disposed on a side portion of the rear wheel house 70; and a connecting member 6 connecting between the wheel house side part reinforcing member 90 and the rear cross member 60 and connecting to the upper stiffener 4. The connecting member 6 includes: a forward connecting member 100 that constitutes a forward portion of the connecting member 6; and a rearward connecting member 110 that constitutes a rearward portion of the connecting member 6. The forward connecting member 100 is formed to have a higher strength than the rearward connecting member 110.

This means that the connecting member 6 is strengthened locally at a side where the rear seat is disposed. This structure of the vehicle body rear structure 1 makes it possible to, while ensuring the formability of the connecting member 6, reduce an increase in the weight and improve the anti-collision performance.

According to the vehicle body rear structure 1, a closed cross section defined together by the floor panel 2 and the rear cross member 60, a closed cross section defined together by the wheel house reinforcing member, the upper stiffener 4, and the rear wheel house 70 are continuously defined.

This continuously defined closed cross sections of the vehicle body rear structure 1 improves the rigidity of the vehicle body and firmly receives the load in the event of a collision (side collision) in a manner of distributing the load in a large area.

Although an embodiment of the present invention has been described above, it is to be understood that the present invention is not limited only to the above-described embodiment and the embodiment can be modified as appropriate within the range not departing from the gist of the invention. For example, the order in which the connecting portions arranged offset in the front-rear direction is not limited to the one described above.

What is claimed is:

1. A vehicle body rear structure comprising:
a floor panel;
a rear frame extending in a vehicle front-rear direction on a vehicle width direction end side of the floor panel and having an upper portion in which an opening is formed;
a rear wheel house extending upward from a vehicle width direction outer portion of the rear frame;
a rear cross member located on a vehicle width direction inner side of a lower portion of the rear wheel house and disposed extending in a vehicle width direction on the floor panel;
a wheel house reinforcing member extending in an up-down direction along the rear wheel house; and
an upper stiffener extending in the vehicle front-rear direction and covering the opening,
wherein the upper stiffener comprises a forward stiffener and a rearward stiffener, the forward stiffener and the rearward stiffener being formed as separated members and aligned in a front-rear direction,
wherein the wheel house reinforcing member has a lower portion connected to the upper stiffener and to the rear cross member, and
wherein the forward stiffener and the rearward stiffener are connected to each other at a first connecting portion located offset in the front-rear direction from a second connecting portion at which the upper stiffener and the wheel house reinforcing member are connected to each other.

2. The vehicle body rear structure according to claim 1, wherein the forward stiffener and the rearward stiffener are overlapped at the first connecting portion at which the forward stiffener and the rearward stiffener are connected to each other, and the first connecting portion comprises two connecting points arranged in the vehicle front-rear direction.

3. The vehicle body rear structure according to claim 1, wherein the vehicle body rear structure further comprises a gusset attached to and between the forward stiffener and the rear wheel house,
wherein the wheel house reinforcing member is connected, at the second connecting portion, to the rearward stiffener, and
wherein a third connecting portion at which the gusset and the forward stiffener are connected to each other, the first connecting portion at which the forward stiffener and the rearward stiffener are connected to each other, and the second connecting portion at which the rearward stiffener and the wheel house reinforcing member are connected to each other are arranged in this order from front to rear.

4. The vehicle body rear structure according to claim 1, wherein the forward stiffener is formed to have a higher strength than the rearward stiffener.

5. The vehicle body rear structure according to claim 1, wherein the wheel house reinforcing member comprises:
a wheel house side part reinforcing member disposed on a side portion of the rear wheel house; and
a connecting member connecting between the wheel house side part reinforcing member and the rear cross member and connecting to the upper stiffener,
wherein the connecting member comprises a forward connecting member that constitutes a forward portion of the connecting member and a rearward connecting member that constitutes a rearward portion of the connecting member, and
wherein the forward connecting member is formed to have a higher strength than the rearward connecting member.

6. The vehicle body rear structure according to claim 1, wherein the floor panel and the rear cross member together define a first closed cross section,
wherein the wheel house reinforcing member, the upper stiffener, and the rear wheel house together define a second closed cross section, and
wherein the first closed cross section and the second closed cross section are continuously defined.

* * * * *